Patented Aug. 26, 1924.

1,506,425

UNITED STATES PATENT OFFICE.

GEORGE W. HEISE, OF ELMHURST, NEW YORK, ASSIGNOR TO NATIONAL CARBON COMPANY, INC., A CORPORATION OF NEW YORK.

LIBERATION OF OIL FROM OIL-CONTAINING DEPOLARIZERS.

No Drawing.   Application filed May 11, 1922.   Serial No. 560,231.

*To all whom it may concern:*

Be it known that I, GEORGE W. HEISE, a citizen of the United States, residing at Elmhurst, in the county of Queens and State of New York, have invented certain new and useful Improvements in Liberation of Oil from Oil-Containing Depolarizers, of which the following is a specification.

This invention relates to galvanic cells in which an alkali metal hydroxid solution is used as the electrolyte, especially primary cells of the zinc-alkali-copper oxid type.

In such cells it is customary to prevent evaporation and to protect the electrolyte from dust and reaction with atmospheric carbon dioxid by superposing a layer of a non-volatile oil upon the electrolyte. It has been shown in the patent to R. W. Erwin, 1,295,459, dated Feb. 25, 1919, that important advantages from the standpoint of convenience of assembly, as well as increased service life, are obtained by incorporating the oil with the copper oxid depolarizer, instead of pouring it upon the surface of the electrolyte, as in prior practice. When the oil-carrying depolarizer is immersed in the hydroxid solution, the oil separates in part and rises to the surface of the liquid, thus automatically forming the desired protective layer. However, the liberation of the oil is slow and incomplete, frequently as much as 20% of the initial amount of oil remaining in the depolarizer.

I have discovered that the tendency of copper oxid to sorb and retain oil is less than its tendency to sorb and retain certain other liquids. That is, the sorption of liquids by copper oxid depolarizer is selective, the extent of the sorption varying with the nature of the sorbed liquid. From this it follows that a liquid for which the selective sorptive capacity of the oxid is high will displace a sorbed liquid for which this capacity is of a lower order. It will be understood that sorption and the like as used herein are generic to adsorption, absorption, and related phenomena.

According to the present invention, suitable liquids are brought into contact with the oil-containing depolarizer and operate to secure a rapid and substantially complete displacement of oil therefrom. The alcohols are the preferred liquids for this purpose.

While I believe that the phenomena described are due to selective sorption, it will be understood that the term is used herein in a sense sufficiently comprehensive to include any physical characteristic of a solid which causes one liquid to displace another, without substantial solution, from association with the solid. The displacement of oil from copper oxid by water appears to be due in the main to the difference in the specific gravity of the two liquids, which causes that portion of the oil within the interstices of the depolarizing mass to separate and rise to the surface of the water. I do not consider that water is capable of effectively displacing oil held in a state of sorption by copper oxid. But whatever the mechanism of the displacement, my experiments demonstrate that substances, of a type hereinafter defined, liberate oil from the depolarizer more rapidly and more completely than aqueous liquids alone effect such liberation.

In the preferred form of the invention, methyl or ethyl alcohol is added to the sodium hydroxid electrolyte, and the solution is made homogeneous by shaking or stirring. Two or three ounces of alcohol are sufficient for cells of the usual size, containing about 4 liters of electrolyte. This amount may of course be varied and will be determined to a large extent by the character of the depolarizer and oil used. Ethyl alcohol is less volatile than methyl alcohol and is preferable for that reason.

While reference has been made to the addition of alcohols only to the caustic electrolyte, it will be understood that the use of other liquids not injurious to the cell, and for which copper oxid depolarizer has a higher sorptive capacity than for oil, falls within the scope of the invention, provided such liquids are miscible with the electrolyte or can be brought into contact with the oil-containing depolarizer in any other suitable way. The use of solvents for the oil is not precluded, if the oil solution so formed is of less specific gravity than the electrolyte and is otherwise capable of forming a satisfactory protective layer. Such solvents, however, are in general immiscible with the electrolyte and are therefore difficult to bring into adequate contact with the depolarizer. For this reason, gasoline, ether, benzene, and the like, are not so suitable for displacing the oil as are the alcohols, which are soluble in the electrolyte but do not dissolve the oil to any material extent. Nevertheless, oil solvents may in some cases be used and they are included in the present invention.

I claim:—

1. Process of liberating oil from an oil-containing depolarizer, comprising bringing into contact therewith water and a substance capable of expediting the liberation of the oil from the depolarizer.

2. Process of liberating oil from an oil-containing copper oxid depolarizer adapted for use in a cell having for electrolyte an aqueous solution of caustic alkali, comprising adding to such electrolyte a substance capable of expediting the liberation of the oil from the depolarizer.

3. The invention according to claim 2, in which an alcohol is used to liberate the oil.

4. In a cell having an oil-containing depolarizer, an electrolyte comprising water and dissolved alkali, and containing a liquid capable of liberating oil from the depolarizer more effectively than aqueous liquids liberate the oil.

5. In a cell having an oil-containing depolarizer, an electrolyte containing alcohol.

In testimony whereof, I affix my signature.

GEORGE W. HEISE.